W. P. Letchworth.
Wood-Bending Machine.
No. 3,850. Reissued Feb. 22, 1870.
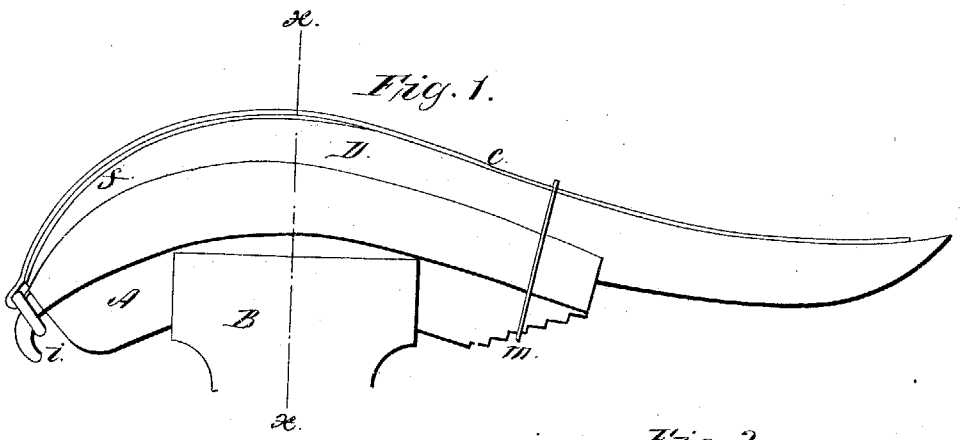
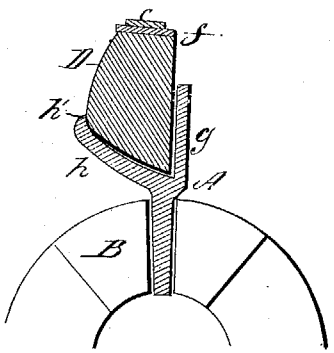
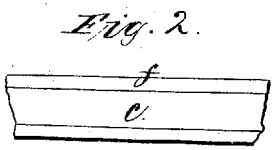
Witnesses:
Jay Hyatt
Geo W Miatt
Inventor:
Wm P Letchworth
by J Fraser & Co
Attys
N. PETERS, PHOTO-LITHOGRAPHER, WASHINGTON, D. C.

UNITED STATES PATENT OFFICE.

WILLIAM P. LETCHWORTH, OF BUFFALO, NEW YORK.

IMPROVEMENT IN MACHINES FOR BENDING WOOD.

Specification forming part of Letters Patent No. 81,095, dated August 18, 1868; Reissue No. 3,850, dated February 22, 1870.

*To all whom it may concern:*

Be it known that I, WILLIAM P. LETCHWORTH, of the city of Buffalo, in the county of Erie and State of New York, have invented certain new and useful Improvements in the Manufacture of Hames, of which the following is a specification.

Hames have heretofore been made by first planing or shaving a piece of wood to the required size of the hame as to thickness and width, when the strap of iron designed for the back of the hame is attached, and the stick is bent over a "former-block" of the desired curvature of the finished hame. After being thus bent, the hame is finished, and the outer side at its inner edge beveled off to the angle required, to cause it to fit in the recess formed at the junction of the roll of the collar with the padded portion, whereby the hame is retained in place therein.

I am also aware that grooved formers for bending plow-handles and other pieces of wood have been used previous to my invention.

My invention consists of a former-block, B, having an angular groove or channel of varying width made therein, one side of which groove is plane and vertical, to fit the inner side of the hame, while the other side is made of an irregular shape, to conform with the outer and unequally-beveled and rounded side of the hame, so that as the latter is bent therein its sides will closely fit and overlap the sides of the hame throughout the length of the groove, and firmly and steadily hold it in its proper position and prevent it from twisting or warping, as it would do were not the cross-section of the groove at different points made to correspond with the varying shape and angle of the inner edge of the hame.

In the accompanying drawings, Figure I is a side elevation of a grooved former with a hame bent therein. Fig. II is a plan view of a portion of the iron strap on the back of the hames with the auxiliary strip, which may be employed while bending the latter; Fig. III, a cross-section in line *x x*, Fig. 1.

Like letters of reference designate like parts in each of the figures.

A is the former, preferably made of cast-iron; B, a frame or vise for holding the same. The groove or channel in the casting A is formed by the two sides or flanges *g h*, the flange *g* being vertical, to fit the plane inner side of the hame, and the flange *h* diverging, so as to conform with the beveled outer side, the angle of the groove corresponding with the angle of the inner edge of the hame, which generally varies more or less at different points.

D is the wooden portion of the hame, fashioned complete, as shown in Fig. III; *c*, the usual metallic strap, fastened to the back or outer edge; *i*, the ring or loop at the lower end, to which the hame strap or fastener is attached. *f* is a thin strip of metal, of a width equal to or a little more than that of the back of the hame, which I prefer to temporarily insert, during the process of bending, between the strap *c* and that portion of the hame which is to be bent. The hame being fashioned and ironed, as hereinbefore described, and subjected to the usual steaming process, the ring *i* is engaged over a hook at the end of the former A, and the hame bent into the groove or channel by means of a lever or other suitable mechanical power. It may then be fastened in place by a link, *m*, which slides on the hame, and engages in any of a series of notches, *n*, at the end of the casting A, as shown in Fig. I. Any other suitable device, however, for the purpose may be employed. The metallic strip *f* serves to protect the edges of the back of the hame and prevent them from breaking or slivering up during the bending process, this strip being removed after the hame has been bent.

One of the advantages of my improvement is the great saving in the cost of manufacture, as the shaping of the stick before being bent can readily be accomplished by machinery, whereby the time and labor employed in beveling and finishing by hand, required in the process hereinbefore described, is avoided, and the expense of manufacture correspondingly reduced.

To bend a hame-stick completely fashioned requires the base of the groove in the former-block to be made so as to snugly fit the comparatively sharp inner edge of the hame-stick, in order to prevent the edge of the steamed and softened wood from being crushed or forced out of shape by the pressure employed in bending the hame. This groove or channel should be sufficiently deep for its sides to act as guides to retain the hame-stick in its proper position while being bent, while the width of the groove should be made to vary with the thickness of the hame to prevent the latter from twisting out of shape, which, from its peculiar form, it is apt to do when not thus confined. The groove being made of this shape will insure the hames being made uniform and of a required curvature, while it will straighten and remove any wind or twist that may be in the hame-stick before it is bent.

It will be borne in mind that it is much more difficult and requires considerable more time and labor to properly shape the rounded or beveled outer side of the hame after it is bent than before when it is straight, which difference is saved by the use of my improvement, whether the hames are shaped by hand or machinery.

What I claim as my invention is—

The former A, grooved to the contour of the inside of the finished hame, as herein described, so that hames may be completely fashioned to their proper cross-sectional form and then bent, as and for the purpose set forth.

WM. P. LETCHWORTH.

Witnesses:

R. H. DANFORTH,

F. L. DANFORTH.